(12) United States Patent  
Poe, Sr.

(10) Patent No.: US 6,455,123 B1
(45) Date of Patent: Sep. 24, 2002

(54) NONSLIP PADDED MAT

(76) Inventor: Ernest B. Poe, Sr., 5530 Hillcrest Dr., Union City, GA (US) 30291

( * ) Notice: Subject to any disclaimer, the term of this patent is extended or adjusted under 35 U.S.C. 154(b) by 0 days.

(21) Appl. No.: 09/390,429

(22) Filed: Sep. 7, 1999

Related U.S. Application Data

(60) Provisional application No. 60/099,354, filed on Sep. 8, 1998.

(51) Int. Cl.$^7$ .................................................. B32B 3/06
(52) U.S. Cl. .............................. 428/102; 4/581; 4/582; 4/583; 15/215; 15/216; 428/86; 428/120; 428/138; 428/166; 428/167
(58) Field of Search .................... 428/86, 102, 120, 428/138, 166, 167; 15/215, 216; 4/581, 582, 583

(56) References Cited

U.S. PATENT DOCUMENTS

| | | | | |
|---|---|---|---|---|
| 3,940,532 A | * | 2/1976 | Smith, II .................... 428/218 |
| 4,285,075 A | * | 8/1981 | Nelson ........................... 4/252 |
| 4,748,063 A | | 5/1988 | Reuben |
| 4,758,457 A | * | 7/1988 | Altus ........................... 428/82 |
| 4,829,627 A | * | 5/1989 | Altus et al. ..................... 16/4 |
| 4,876,135 A | * | 10/1989 | McIntosh ...................... 428/74 |
| 4,917,932 A | | 4/1990 | McClung |
| 4,921,742 A | * | 5/1990 | Altus ........................... 428/81 |
| 4,968,548 A | | 11/1990 | Gibson |
| 5,028,468 A | * | 7/1991 | Taylor ........................... 428/71 |
| 5,170,526 A | * | 12/1992 | Murray ......................... 15/215 |
| 5,171,619 A | * | 12/1992 | Reuben ......................... 428/95 |
| 5,198,278 A | * | 3/1993 | Sumimoto et al. ............. 428/95 |
| 5,227,214 A | * | 7/1993 | Kerr et al. ..................... 428/95 |
| 5,358,768 A | | 10/1994 | Wiley et al. |
| 5,902,662 A | * | 5/1999 | Kerr ............................. 428/95 |
| 6,219,876 B1 | * | 4/2001 | Blum et al. ................... 15/215 |

FOREIGN PATENT DOCUMENTS

EP 0 325 040 * 12/1988 .......... A47G/27/04

* cited by examiner

Primary Examiner—Cheryl A. Juska
Assistant Examiner—Arti R. Singh
(74) Attorney, Agent, or Firm—Barry E. Kaplan; Myers & Kaplan

(57) ABSTRACT

In a preferred embodiment, the present invention comprises a layer having carpeted upper surface and/or other rubber-like padding material covered by a translucent, elastomeric sheet. The upper elastomeric layer may have downwardly depending projections that engage the carpeted upper surface of the inner padding layer, thereby reducing the likelihood of the upper elastomeric layer from slipping relative to the inner padding layer. The upper elastomeric layer is sewn or otherwise affixed to the carpeted surface to prevent slipping and creasing of the upper elastomeric layer relative to the padding during use. In addition, in a preferred embodiment for use on carpeted surfaces, the lower elastomeric layer may have downwardly depending projections that engage in the underlying carpet surface to reduce slipping of the device relative to the underlying surface. An overcovering material may be provided to further protect the upper elastomeric layer from excessive soiling.

22 Claims, 2 Drawing Sheets

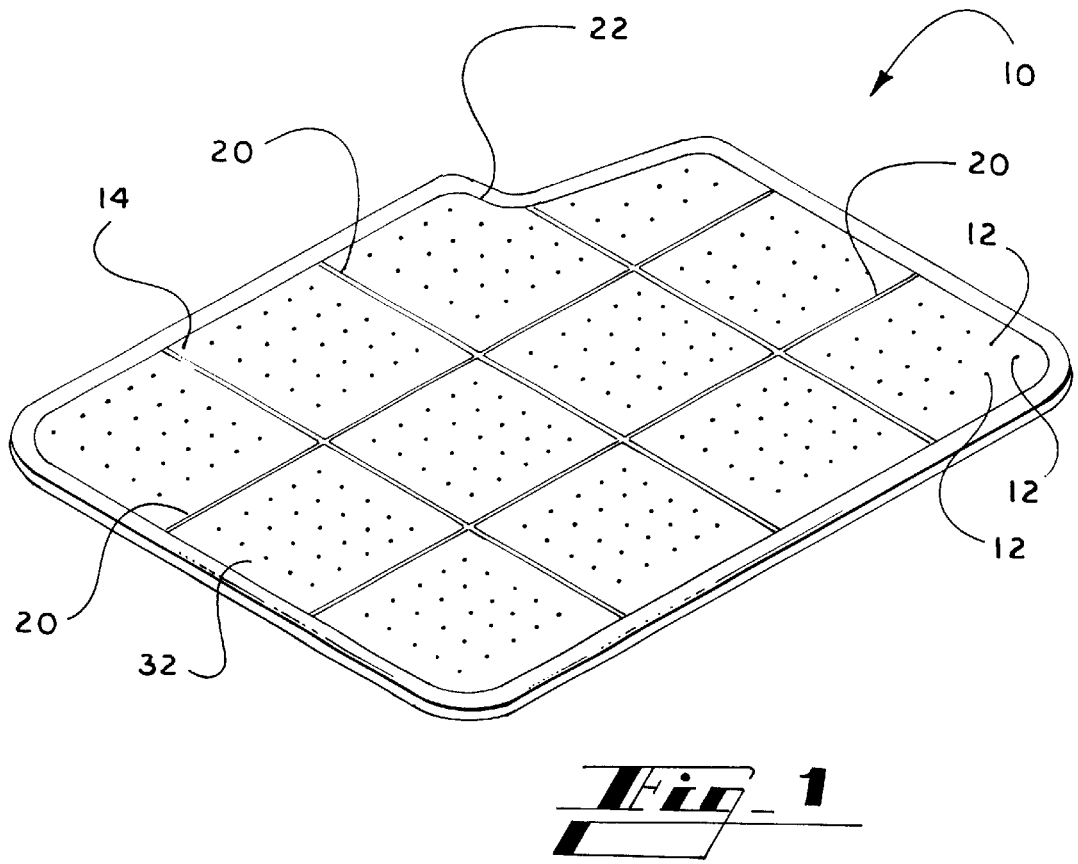
Fig_1
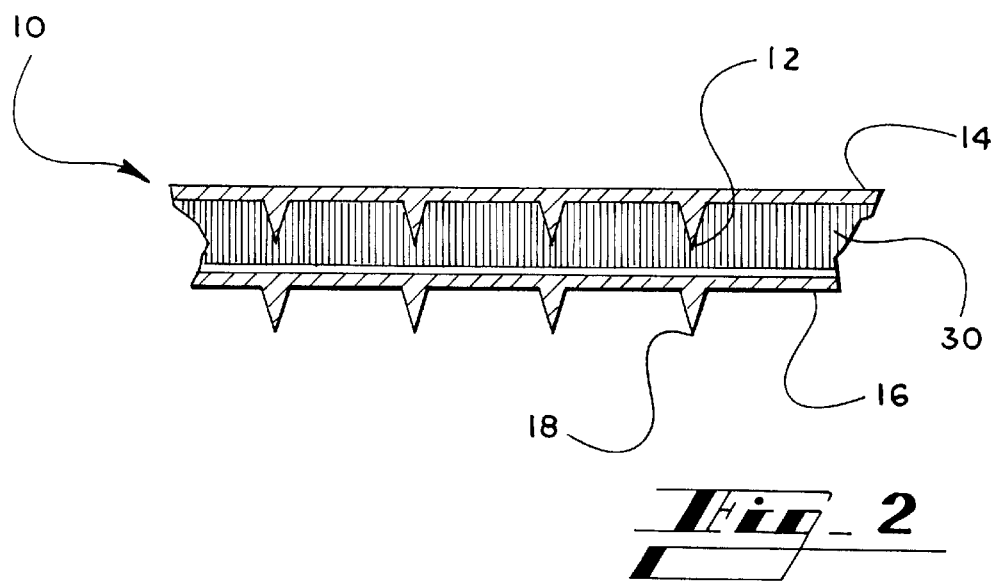
Fig_2

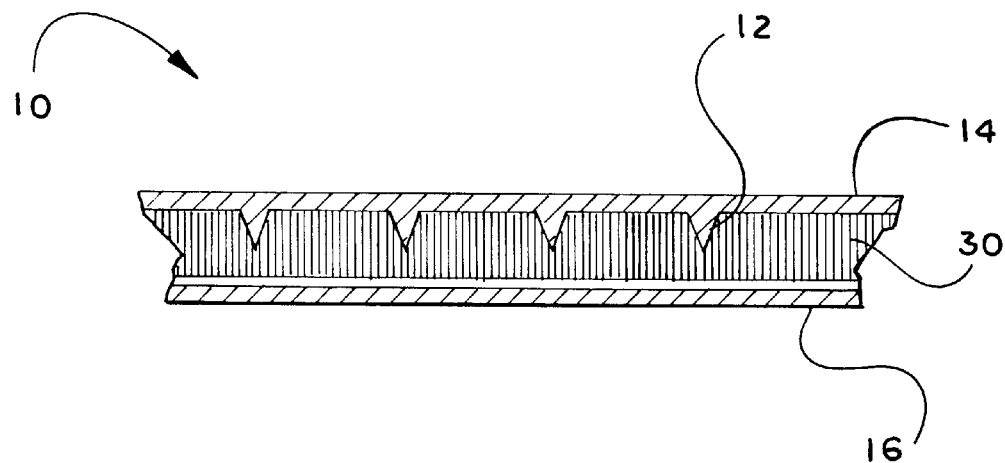
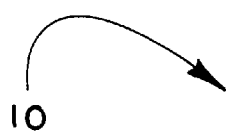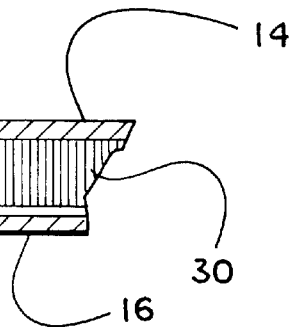

NONSLIP PADDED MAT

RELATED APPLICATIONS

The inventor hereof claims priority based upon provisional patent application Ser. No. 60/099,354 filed Sep. 8, 1998.

FIELD OF THE INVENTION

This invention relates generally to mats; and, more particularly, to a new and improved nonslip, padded mat.

BACKGROUND OF THE INVENTION

Mats are widely used for a multitude of applications. For instance, in automobile applications, mats are placed on the floorboards in the passenger compartment and in the trunk to protect the underlying carpet and to provide a nonslip surface; and, in passenger compartment applications, to provide added comfort to the owners and passengers. In addition, in home and office applications, mats are utilized in entrance-ways, showers and tubs, and under office chairs and heavy equipment, to name only a few such applications. Mats can also be found in fitness applications such as workout and equipment (i.e., treadmill, weight machine) mats. Because of the enormous widespread use of mats, any improvement, however slight, can have a tremendous increase in net public utility.

Mats have historically been manufactured using a simple padding or other sponge-like material (i.e., rubber, cotton, synthetic fibers). However, these types of unprotected mats have many disadvantages. For instance, in high-traffic or high-use areas, the mats quickly wear or deteriorate, resulting in the need for costly, premature replacement. Another disadvantage of these simple designs is the fact that many of the mats will slip during use, causing an increase in wear and tear, and resulting in an increase in potential for accidents and injuries.

In an attempt to eliminate or reduce some of the above-discussed disadvantages, a variety of mat designs have been proposed. For instance, mats having elastomeric projections on the lower surface of the mat have been disclosed wherein the projections penetrate an underlying carpet to help secure the mat into a desired position. An example of such a device may be found by reference to U.S. Pat. No. 4,748,063 to Reuben. Such devices are disadvantageous in that the top surface is carpet or similar material; and, thus, the top surface wears relatively quickly and is not easily cleanable. In addition, over time, the carpeted top layer can separate from the bottom layer, thus causing the top surface to slide during use. Some designs, as in U.S. Pat. No. 4,917,932 to McClung, incorporate an additional pad on the top layer to help prevent wear in a high-use area. For instance, in automobile floor-mat applications, a pad is placed at a location corresponding to where the heel of a shoe might rest during use. Although this helps to protect that specific area, this design is disadvantageous in that the remaining portion of the mat is exposed and, thus, unprotected.

U.S. Pat. No. 5,358,768 to Wiley, III, discloses a two piece mat having an upper carpeted portion and a lower, rubber-like portion. The upper carpeted portion can be removed to protect it against staining and wetting by soiled shoes. This design, however, requires the burden of removing the upper portion and does not adequately protect the carpeted portion from other wear and tear.

In addition to the above-discussed disadvantages, the referenced prior art does not adequately prevent the separation or creasing of the mat while positioned on an uneven surface (i.e., in automobile applications).

It is readily apparent that a new and improved padded mat encased in a nonslip material that securely engages with a surface area and decreases creasing and separation of the encasing material from the padding material is needed. It is, therefore, to the provision of such an improvement that the present invention is directed.

BRIEF SUMMARY OF THE INVENTION

In accordance with the several objects of this invention, presented is a nonslip, padded mat for use, primarily, in automobile applications such as floor mats and trunk mats; however, the invention may also be utilized for many home and business applications. In a preferred embodiment, the present invention comprises a layer having carpeted upper surface and/or other rubber-like padding material covered with a translucent upper elastomeric sheet. The upper elastomeric layer may have downwardly depending projections that engage the carpeted upper surface of the inner padding layer, thereby reducing the likelihood that the upper elastomeric layer will slip relative to the inner padding layer. The upper elastomeric layer is sewn or otherwise affixed to the carpeted surface to prevent slipping and creasing of the upper elastomeric layer relative to the padding during use. In addition, in a preferred embodiment for use on carpeted surfaces, a lower elastomeric layer may be provided with downwardly depending projections that engage an underlying carpeted surface, in order to reduce slipping of the device relative to the underlying surface. An overcovering material may be provided to further protect the upper elastomeric layer from excessive soiling.

A feature and advantage of the present invention is to provide a new and improved nonslip, padded mat that is protected from water and dirt and can be easily cleaned.

Another feature and advantage of the present invention is to provide a new and improved nonslip, padded mat having means for removably securing the mat to the applied surface to prevent slipping of the mat during use.

Another feature and advantage of the present invention is to provide a new and improved nonslip, padded mat having downwardly depending projections on the upper covering layer for engaging the padding/carpet layer material to help prevent slipping and separation between the covering material and the padding/carpet layer. In addition, when the mat is creased or placed on an uneven surface, the projections assist in ensuring the encasing material returns to its proper position relative to the padding/carpet material.

Another feature and advantage of the present invention is to provide a new and improved nonslip, padded mat whereby the upper elastomeric layer is sewn or otherwise affixed to the carpeted surface to prevent slipping and creasing of the elastomeric layer relative to the padding during use.

Another feature and advantage of the present invention is to provide a new and improved nonslip, padded mat that is translucent, to enable the viewing of desired indicia carried by the padding/carpet layer, such as an automobile manufacturer's logo or some other pattern or artistic design.

Another feature and advantage of the present invention is to provide a new and improved nonslip, padded mat having an overcovering material to further protect the upper elastomeric layer from excessive soiling.

Other objects, features, and advantages of the present invention will become apparent to those skilled in the art by

BRIEF DESCRIPTION OF THE DRAWINGS

The invention is better understood by reading the Detailed Description of the Preferred Embodiments with reference to the accompanying drawing figures, in which like reference numerals denote similar structure and refer to like elements throughout, and in which:

FIG. 1 is a perspective view of the preferred embodiment of the present invention;

FIG. 2 is a cutaway side view of a preferred embodiment of the present invention;

FIG. 3 is a cutaway side view of an alternate embodiment of the present invention; and, FIG. 4 is a cutaway side view of a second alternate embodiment of the present invention.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE PREFERRED EMBODIMENT

In describing preferred and alternate embodiments of the present invention, illustrated in FIGS. 1–4, specific terminology is employed for the sake of clarity. The invention, however, is not intended to be limited to the specific terminology so selected, and it is to be understood that each specific element includes all technical equivalents, which operate in a similar manner to accomplish a similar purpose.

Referring now to FIGS. 1 and 2, there is shown a preferred embodiment of the present invention, indicated generally by reference numeral 10. Generally, device 10 comprises preferably covering 22 and padding 30.

Covering 22 comprises upper layer 14, lower layer 16, upper projections 12, and lower projections 18. Covering 22 is a translucent, elastomeric material having a porous, grooved, or other high friction surface to reduce slippage during use. In a preferred embodiment, covering 22 completely covers padding 30 and is sewn 20 to padding 30 to prevent slipping and creasing of covering 22 relative to padding 30 during use. In addition, upper layer 14 of covering 22 comprises a plurality of spaced apart, downwardly depending projections 12 that engage into padding 30 to additionally secure covering 22 to padding 30. Upper projections 12 are shaped substantially frustoconically or blunted conically and are made from an elastomeric material. Upper projections 12 are integrally molded to upper layer 14 of covering 22.

Translucent overcovering material 32 may be provided to further protect covering 22 from collecting excessive dirt and to maintain the pristine appearance of covering 22. In preferred form, overcovering material 32 is provided with one gummed surface, backed with a separable protecting sheet. When the separable protecting sheet is removed, the gummed surface is thereby exposed for use. The gummed surface is brought into contact with covering 22 in any surface location preferred by the user. When the upper surface of overcovering material 32 is soiled, it may be removed and discarded. Covering 22 may be cleaned in a conventional manner and new overcovering material 32 may be applied in the provided manner.

In a preferred embodiment, lower layer 16 of covering 22 comprises a plurality of spaced apart, downwardly depending projections 18 that engage a carpeted surface or other similar surface upon which device 10 will be placed. Lower projections 18 are shaped substantially frustoconically or blunted conically and are made from an elastomeric material. Lower projections 18 are integrally molded to lower layer 16 of covering 22. In the alternate embodiment of FIG. 3, lower layer 16 will not comprise lower projections 12 in order to facilitate the use of device 10 on hard, solid surfaces; rather, lower layer 16 may comprise a nonslip material such as rubber, foam rubber, or the like.

In the second alternate embodiment of FIG. 4, no projections are provided. Rather, covering 22 completely covers padding 30 and is sewn 20 to padding 30 to prevent slipping and creasing of covering 22 relative to padding 30 during use.

It will be appreciated that padding 30 can be made from a multitude of materials such as rubber, cotton, or carpet. In a preferred embodiment for automobile or boating applications, padding 30 is simply a typical floor mat having a carpeted upper surface. Indicia may be placed on the upper surface of padding 30 for viewing by the user.

As is apparent to those skilled in the art from the disclosure herein, sewn seams 20 may be made in various patterns as may be desired by the user. In addition, the overall shape of device 10 will vary depending on the specific application. In order to accommodate various applications, lower projections 18 can be located in selected regions or on the corners of lower layer 16 of covering 22. It should also be noted that covering 22 may be heat sealed to padding 30 in lieu of, or in addition to, sewn seams 20.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

I claim:

1. A mat for removably resting upon a surface comprising:
   (a.) a planar carpeting layer;
   (b.) a transparent planar upper layer substantially covering in overlying relationship said carpeting layer; and,
   (c.) spaced apart attachment by means of stitching distributed in a pattern and essentially across said planar upper layer, for affixing said carpeting layer to said upper layer, and for allowing said carpeting layer and said upper layer to resist slipping or bunching across said respective layers, and between said respective layers, when external forces are applied to said respective layers.

2. The mat of claim 1 further comprising projections carried by said upper layer and depending therefrom toward said carpeting layer for engaging said carpeting layer in order to resist slipping between layers when external forces are applied to said layers.

3. The mat of claim 1 wherein said stitching further comprises a decorative pattern.

4. The mat of claim 1 wherein said upper layer further comprises indicia.

5. The mat of claim 1 further comprising removably affixed overcovering material disposed adjacent said upper layer in overlying relationship.

6. The mat of claim 5 wherein said removably affixed overcovering material comprises a plurality of sheets.

7. The mat of claim 1 further comprising a lower layer for underlying said carpeting layer, said carpeting layer substantially covering and affixed to said lower layer in overlying relationship.

8. The mat of claim 7 wherein said lower layer further comprises projections carried by and depending therefrom for engaging the surface in order to resist slipping between layers when external forces are applied to said layers.

9. A mat for removably resting upon a surface comprising:
(a.) a planar carpeting layer;
(b.) a transparent planar upper layer substantially covering in overlying relationship said carpeting layer;
(c.) spaced apart attachment by means of stitching distributed in a pattern and essentially across said planar upper layer for affixing said carpeting layer to said upper layer, and for allowing said carpeting layer and said upper layer to resist slipping or bunching across said respective layers, and between said respective layers, when external forces are applied to said respective layer; and,
(d.) a removably affixed overcovering material disposed adjacent said upper layer in overlying relationship.

10. The mat of claim 9 further comprising projections carried by said upper layer and depending therefrom toward said carpeting layer for engaging said carpeting layer in order to resist slipping between layers when external forces are applied to said layers.

11. The mat of claim 9 wherein said stitching further comprises a decorative pattern.

12. The mat of claim 9 wherein said upper layer further comprises indicia.

13. The mat of claim 9 wherein said removably affixed overcovering material comprises a plurality of sheets.

14. The mat of claim 9 further comprising a lower layer for underlying said carpeting layer, said carpeting layer substantially covering and affixed to said lower layer in overlying relationship.

15. The mat of claim 14 wherein said lower layer further comprises projections carried by and depending therefrom for engaging the surface in order to resist slipping between said layers when external forces are applied to said layers.

16. A mat for removably resting upon a surface comprising:
(a.) a planar carpeting layer;
(b.) a transparent planar upper layer substantially covering in overlying relationship said carpeting layer;
(c.) a transparent planar lower layer for underlying said carpeting layer, said carpeting layer substantially covering said lower layer in overlying relationship;
(d) spaced apart attachment by means of stitching distributed in a pattern and essentially across said planar upper layer, said lower layer for affixing said carpeting layer to said upper layer and said lower layer, and for allowing said carpeting layer and said upper and lower layers to resist slipping or bunching across said respective layers, and between said layers, when external forces are applied to said respective layers; and,
(e.) a removably affixed overcovering material disposed adjacent said upper layer in overlying relationship.

17. The mat of claim 16 further comprising projections carried by said upper layer and depending therefrom toward said carpeting layer for engaging said carpeting layer in order to resist slipping between layers when external forces are applied to said layers.

18. The mat of claim 16 further comprising attachment means for affixing said carpeting layer to said upper layer.

19. The mat of claim 16 wherein said stitching further comprises a decorative pattern.

20. The mat of claim 16 wherein said upper layer further comprises indicia.

21. The mat of claim 16 wherein said removably affixed overcovering material comprises a plurality of sheets.

22. The mat of claim 16 wherein said lower layer further comprises projections carried by and depending therefrom for engaging the surface in order to resist slipping between said layers when external forces are applied to said layers.

* * * * *